May 28, 1963  B. A. GALBRAITH  3,091,712
VIBRATORY APPARATUS
Filed Dec. 23, 1960
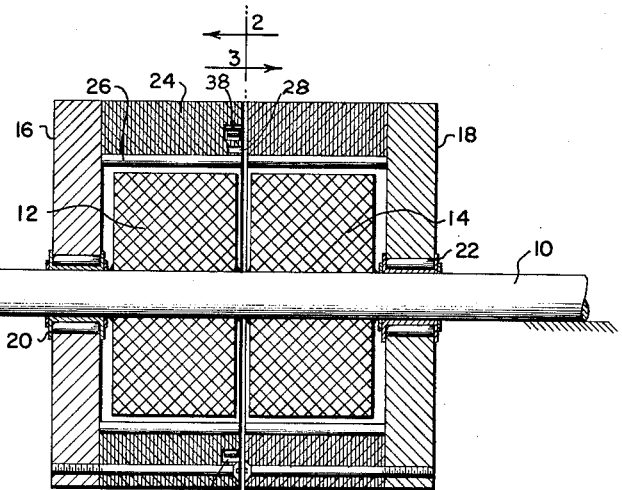
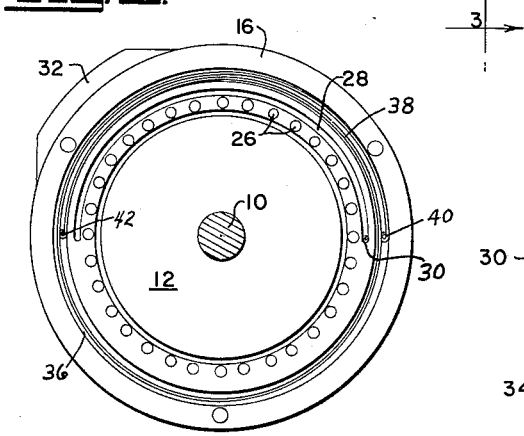
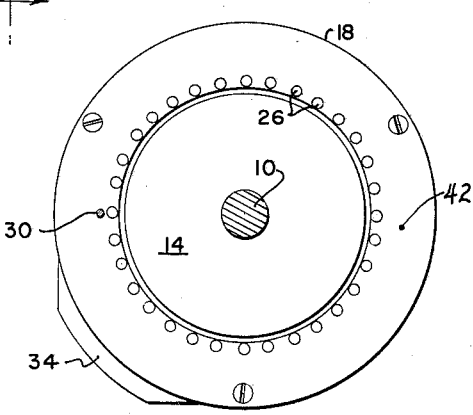
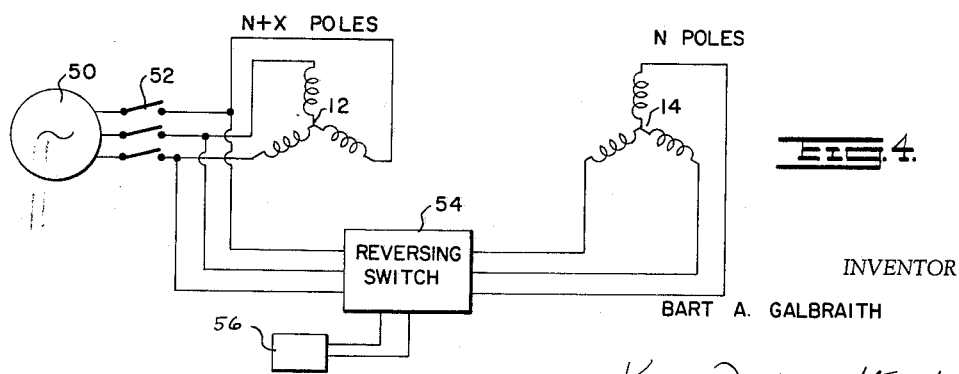
INVENTOR
BART A. GALBRAITH
BY  Kenon, Palmer & Stewart
ATTORNEY United States Patent Office 3,091,712
Patented May 28, 1963

3,091,712
VIBRATORY APPARATUS
Bart A. Galbraith, 310 W. Salem Ave., Roanoke, Va.
Filed Dec. 23, 1960, Ser. No. 77,959
8 Claims. (Cl. 310—81)

This invention relates to vibratory apparatus and more particularly to a novel rotary dynamoelectric machine, the rotary members of which are capable of rotation in either a mechanically balanced or unbalanced position in response to selective electrical control.

Vibrators are useful in many industrial operations today, such for example as concrete block making machines, large commercial shaker screens and the like. In all such applications, it is very desirable to have a high power source of vibrations which can be stopped and started at will. In my prior U.S. Patents Nos. 2,667,967 and 2,728,237, I have disclosed apparatus for this purpose which is driven by a conventional electric motor. The change from a balanced to unbalanced system of rotation is accomplished by providing for slip between a pair of fly wheel members, each carrying eccentrically mounted weights. Both rotary members are mounted on the same shaft and mechanical means are provided to bring the eccentric weight portions either in phase with each other or 180° out of phase with each other to achieve the necessary balanced or unbalanced system of rotation. Apparatus of the type shown in these patents is effective and capable of being shifted between balanced and unbalanced conditions at will while being rotated at the standard speed of the prime mover which is driving them.

The present invention has for its principal object the provision of apparatus of this type wherein the rotary members carrying the eccentrically mounted weights are integral parts of the prime mover itself.

Other objects will be apparent from the following detailed description read in conjunction with the attached sheet of drawings in which:

FIG. 1 is a diagrammatic showing in cross section of an electrical machine incorporating the features in the present invention;

FIG. 2 is a section taken on the lines 2—2 of FIG. 1;

FIG. 3 is a section taken on the lines 3—3 of FIG. 1; and

FIG. 4 is a schematic wiring diagram for the machine shown in FIG. 1.

In general, the objects of the present invention are achieved by providing a pair of stationary adjacent polyphase field structures mounted on a common stationary shaft and surrounding each of these field structures with separately journaled armature members for rotation around the outside of the field structures. The armature members carry the eccentrically mounted weights which, when in the proper phase relation, will cause the rotary portion of the structure to be mechanically unbalanced. The armature members are linked to each other in such manner that the two can rotate together in either a mechanically balanced or unbalanced condition.

Referring now to FIG. 1 of the attached drawings, a stationary shaft is indicated at 10 and a pair of field structures which are mounted on the shaft 10 are shown at 12 and 14. Surrounding the field structures 12 and 14 are a pair of armature members 16 and 18. Each of the armature members is suitably journaled in bearings on the shaft 10, the bearings being shown at 20 and 22. Aside from the rather cup-shaped configuration of the armature members, there is nothing unusual about them since each includes a conventionally laminated annular portion 24 and the equally conventional conductor members 26. With the structure thus far described, it will be obvious that energization of either of the field structures 12 or 14 will result in rotation of the corresponding armature structure about the field structure and the speed of rotation will, of course, be determined by the number of poles in each field structure and on the applied frequency.

Turning now to FIGS. 2 and 3 which provide end views respectively of the armatures 16 and 18, there is shown in the inner radial face of the armature 16 a slot 28 which is circular and concentric with the axis of the shaft 10. In the corresponding radial face of the armature 18, there is provided an axially projecting lug 30. As indicated in FIG. 2, the lug 30 lies on the same radius as the slot 28 and in the assembled position of the parts as shown in FIG. 1, the lug 30 will be received within the slot 28. Because of the pin and slot connection between the two armature members, it will be obvious therefore that the two must rotate together and that they will do so as soon as either is immersed in a rotating magnetic field.

Still referring to FIGS. 2 and 3, the armature members 16 and 18 have mounted thereon eccentrically positioned weights 32 and 34 respectively. With the pin 30 riding in the end of the slot 28 as shown in FIG. 2, the weights 32 and 34 will be positioned 180° apart from each other, and for this reason, assuming the remainder of the armature structures to by symmetrical about their axis, the entire armature assembly will be in a mechanically balanced condition. It will be apparent, however, that if the armature member 18 is made to revolve with respect to the member 16 so that the pin 30 rides around the slot to the opposite end from that shown in FIG. 2, that the weights 32 and 34 will then be in phase with each other and an unbalanced structure is thereby created.

In order to minimize the size of motor needed to produce a given magnitude of vibration, it is desirable that the armature assembly always be in a balanced condition at standstill. This allows the armatures to come up to speed and therefore allows the back E.M.F. of the motor to build up to its rated value without imposing an unbalanced load on the motor during starting conditions. The next desired feature is that once the motor has come up to its rated speed, that it be possible to shift the armature structure from balanced to unbalanced condition and back at will.

In order to accomplish this result, the polyphase field structures 12 and 14 are preferably specially designed. Let us assume that the field structure 12 comprises a greater number of poles than does the field structure 14. This means that with the motor at rest, if the field 12 is energized from a polyphase source that the armature assembly will accelerate to the rated speed of the motor in a balanced condition. Once the motor is up to speed, and it is desired to create an unbalanced structure to achieve the desired vibratory effect, it is then only necessary to energize the field structure 14 having the lesser number of poles. This will cause the armature 18 to attempt to speed up and pass the armature member 16. This it will do, but only within the limit of relative rotation defined by the pin and slot connection between the two members. As illustrated, the armature 18 will then go ahead of the armature 16 by a rotation of 180° which will bring the weights 32 and 34 into phase with each other and the desired vibration will instantly begin. The field structure 14, in addition to having a lesser number of poles than the field structure 12, will also have a different type of winding in that it will have a higher impedance than the winding of field 12 and will thus provide a lower torque than does the field 12. The torque necessary from field 14 is only that which will advance the phase of the armature 18 by the amount permitted by the pin and slot connection because it is not necessary that the machine operate at a higher speed under unbalanced conditions.

While not essential to effective operation of the machine, it is nevertheless desirable that the armatures 16 and 18 be biased to their mechanically balanced position. FIGS. 1, 2 and 3 illustrate one possible means for achieving this result. A second slot 36 is machined in the face of armature 16 concentric with the slot 28 and extending through 360°. Positioned within the slot 36 is a "clock type" spring 38, one end of which is anchored to the armature 16 at 40 in any suitable fashion. The opposite end of the spring is bent to receive a pin 42 which is secured to the armature 18. This arrangement is effective to return the armature assembly to balanced condition whenever the apparatus is at standstill, and thus assures that when first energized, both armatures move together. Otherwise, there might be a shock loading of the pin 30 whenever the device is first energized, caused by acceleration of armature 16 through 180° or less to establish contact between the pin 30 and the end of slot 28.

FIG. 4 shows a simplified schematic wiring diagram capable of functioning in the manner described hereinbefore. A poly-phase source is indicated at 50, and this source is connected through a conventional switch or circuit breaker 52 to field winding 12. This is the field winding with the greater number of poles, and although the winding is shown as star connected this is unimportant as a delta connection would be capable of performing the same function. For simplicity, the field 14 is also indicated as a star connected winding. A reversing switch 54 interconnects the two field structures 12 and 14. It is also desirable for many applications, that the apparatus switches over automatically from balanced to unbalanced condition as soon as the armature assembly is rotating at the rated speed determined by the field 12. One means for accomplishing this result is indicated schematically in FIG. 4 as a speed responsive switch 56 connected to close switch 54 as soon as the armature assembly reaches its rated speed in balanced condition.

In operation, therefore, and assuming the machine to be at standstill, and with the armatures in balanced condition, the switch 52 is first closed, which energizes the field structure 12, and the armatures 16 and 18 will be accelerated to rated speed as determined by the winding 12. Upon reaching rated speed, the switch 56 is actuated closing switch 54 to energize field winding 14, which it will be remembered has the lesser number of poles. Because of this fact, the armature 18 will then try to go faster than the armature 16 and there will be relative rotation between the two until the pin 30 arrives at the opposite end of the slot 28, at which point further relative rotation stops and the eccentrically mounted weights 32 and 34 will be brought into phase or into axial alignment with each other. Relative rotation of the armatures 16 and 18 winds the spring 38. This has the effect of causing the entire motor structure to vibrate, and such vibrations may be usefully applied to any desired apparatus. It it is then desired to return the armature members to their original balanced condition while they are nevertheless still running at the rated speed determined by the field 12, it is only necessary to reverse the connections to two of the phases of the winding 14 which will then promptly return the armature members to the position indicated in FIGS. 2 and 3 corresponding to a balanced position of the weights 32 and 34. If the machine is shut off by opening switch 52, while the armatures are in unbalanced condition, the spring 38 is effective to return them to balanced condition.

Obviously, where a programmed pattern of vibration is desired, this can easily be accomplished by programming operation of the reversing switch 54.

The slot 28 has been shown in the drawings to be of a length corresponding to 180°, but it will be obvious that it could be less than 180° or it could be more than 180°. If it is less or more, the degree of unbalance of the armature structure which is achieved by energization of the field 14 will be less than the maximum which would be provided when the weights 32 and 34 are exactly axially aligned. The amount of vibration could also be varied by varying the mass of the weights 32 and 34.

While a preferred embodiment of the present invention has been herein shown and described, variations will be obvious to those skilled in the art, and applicant claims the benefit of a full range of equivalents within the scope of the appended claims, such range of equivalents necessarily including inversion or reversal of parts arrangement or any control circuit which would give a relative speed differential of the basic revolving components.

I claim:

1. A rotary machine for selectively operating in either a mechanically balanced or unbalanced condition comprising: a pair of rotary dynamo electric machines spaced from each other, one of said machines being designed for higher speed operation than the other; a pair of weights, one mounted eccentrically on the rotary portion of each said machine; means linking the rotary portion of said machines permitting limited movement therebetween, such that said weights are 180° apart creating a balanced rotary structure or less than 180° apart from such position creating an unbalanced structure; and means for separately energizing said machines.

2. A rotary dynamo electric machine for selectively operating in either a mechanically balanced or unbalanced condition comprising: a pair of polyphase field structures spaced longitudinally from each other, one of said field structures having a greater number of poles than the other; a pair of armature members mounted for rotation with respect to said field structures, one operatively associated with each of said field structures; a pair of weights, one mounted eccentrically on each of said armature members; means linking said armature members permitting limited movement between them such that said weights are 180° apart, creating a balanced rotary structure or less than 180° apart from such position creating an unbalanced structure; and means separately controlling the energization of said field structures causing said armature members to rotate in either mechanically balanced or unbalanced condition.

3. Apparatus as defined by claim 2 and including biasing means connected to said armatures and urging them to balanced condition; whereby whenever said machine is deenergized, said armature members will automatically move to balanced condition.

4. Apparatus as defined by claim 2 including a stationary shaft and in which said armature members are separately journaled on said shaft for rotation around the outside of said field structures.

5. Apparatus as defined by claim 2 in which one of said armature members includes a circular groove in a radial face thereof and the other of said armature members includes a lug projecting from a corresponding radial face, said lug being received within said groove to permit said armatures to revolve together in either of two relative positions.

6. Apparatus as defined by claim 5 in which said groove is 180° in circumferential extent.

7. A rotary dynamoelectric machine for selectively operating in either a mechanically balanced or unbalanced condition comprising: a stationary shaft; a pair of polyphase field structures mounted on said shaft in side by side relationship, one of said field structures having a greater number of poles than the other; a pair of cup-shaped armature members separately journaled on said shaft facing each other and each enclosing one of said field structures respectively; means defining a circular slot having the same axis as said shaft and extending 180° about a radial face of one of said armature members; a lug projecting axially from the corresponding radial face of the other of said armature members, said lug being received within said slot; a pair of weights eccentrically mounted, one carried by each of said armature members, and so related to the pin and slot connection therebetween, that when said pin is at one end of said slot, said two weights are 180° apart, creating a balanced armature structure, and when said pin is at the other end of said slot, said weights are aligned axially with each other creating an unbalanced armature structure; means biasing said armature members toward balanced condition; means for first energizing said field structure having the greater number of poles for rotating said armatures in a balanced condition; means for next energizing said field structure having the lesser number of poles to make its associated armature revolve 180° with respect to the other to cause unbalanced rotation of said armature structure; and means for reversing the direction of torque applied by lesser number of poles field structure to return said armature to a balanced condition.

8. Apparatus as defined by claim 7 in which said biasing means comprises: a 360° slot in a radial face of one of said armature members; a clock type spring received within said slot and having one end secured to said armature member, and means on the other armature member connected to the opposite end of said spring.

References Cited in the file of this patent

UNITED STATES PATENTS 2,235,183    Wettlaufer _____ Mar. 18, 1941